United States Patent [19]
Ball et al.

[11] 3,897,159
[45] July 29, 1975

[54] MACHINE TOOL TAPER PROTECTION DEVICE

[76] Inventors: Randell D. Ball, 2122 Statler Dr., Carrolton, Tex. 77713; Rhoderic D. Buser, 2007 Cedar Ln., Ponca City, Okla. 73160

[22] Filed: Dec. 18, 1973

[21] Appl. No.: 389,798

[52] U.S. Cl. .......................................... 401/9; 401/9
[51] Int. Cl. ............................................ A46b 15/00
[58] Field of Search ........................................ 401/9

[56] References Cited
UNITED STATES PATENTS

| | | | |
|---|---|---|---|
| 464,843 | 12/1891 | Bagger | 401/9 |
| 739,653 | 9/1903 | Dalrymple | 401/9 |
| 2,767,417 | 10/1956 | Amen | 401/9 |
| 2,810,145 | 10/1957 | Forrow | 401/9 |
| 3,086,241 | 4/1963 | Bohn | 401/9 |

*Primary Examiner*—Lawrence Charles
*Attorney, Agent, or Firm*—Glen M. Burdick

[57] ABSTRACT

A closure device for a machine tool chuck or tool holder comprising a solid frusto-conical plug having a major portion of its exterior surface covered with a soft-oil-absorbing material; in one embodiment, a lubricating holder for the closure device is also provided.

6 Claims, 3 Drawing Figures

MACHINE TOOL TAPER PROTECTION DEVICE

BACKGROUND OF THE INVENTION

This invention relates to a device which is adapted to temporarily close, lubricate, and prevent rusting and other physical damage in a machine tool mandrel.

Many machine tools are provided with a mandrel or tool holder which comprises a conical or frusto-conical bore, the axis of which bore corresponds precisely with the axis of rotation of the tool. The cutter, milling head, or other tool to be attached to the machine is provided with a frusto-conical spindel having the same degree of taper as does the holder bore. One standard degree of taper currently in use is the Morse taper.

When the machine tool is not in use, the conical bore thereof is prone to accumulate chips, dust, and dirt, with the result that the subsequent insertion of a mandrel therein causes damage to the precisely machined tapered faces. Further, some types of dirt which accumulate in such bores are hygroscopic in nature, and draw moisture from the air, which accelerates rusting and consequent damage of the bore.

SUMMARY OF THE INVENTION

It is accordingly an object of this invention to provide a device which will effectively both close off and simultaneously lubricate the interior surface of such a machine tool bore.

It is another object of the invention to provide a closure device for a tapered machine tool bore, which device is readily inserted into and removed from such bore.

It is a further object of the invention to provide means for easily lubricating and storing a closure device for a tapered machine tool bore.

Briefly, the present invention comprises a solid frusto-conical plug, preferably provided with a gripping surface at its larger end, and having a major portion of its surface covered with a soft-oil absorbing material. In one embodiment, the plug is further provided with a container adapted to receive and lubricate the plug.

BRIEF DESCRIPTION OF THE DRAWING

The invention will be more readily understood, and the various objects, features, and advantages thereof will become more apparent, upon study of the accompanying drawing, in which.

DETAILED DESCRIPTION OF THE INVENTION

Figure 1:
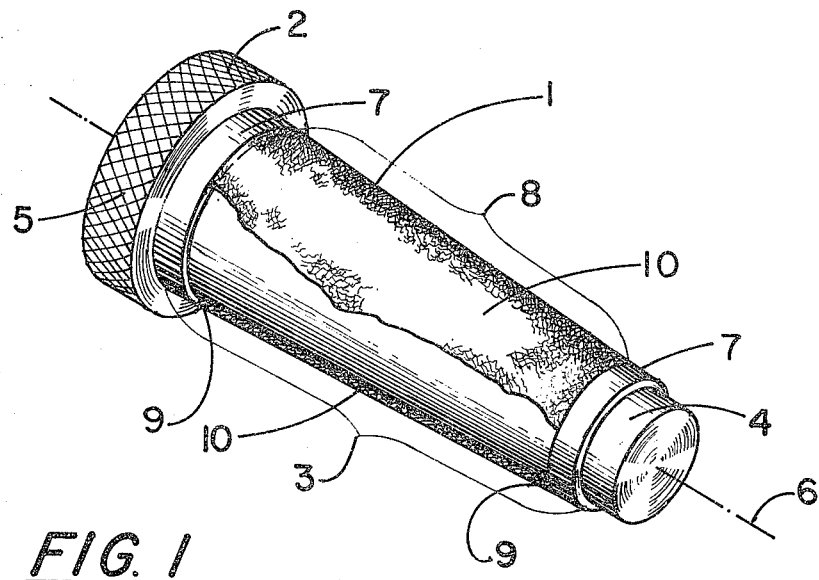
FIG. 1 is a perspective view, partially broken away, of a closure device according to the present invention.

Referring now to the drawing, and to FIG. 1 in particular, numeral 1 indicates the closure device generally, which in turn comprises a gripping end 2, a frusto-conical main body 3, and preferably a small guide end 4. Gripping end 2 is advantageously of short cylindrical configuration, and its cylindrical surface can be provided with a friction-increasing finish such as knurls 5. Main body 3 is of frusto-conical configuration, with its larger end adjacent gripping end 2 as shown. The entire device 1 is conveniently formed to be completely symmetrical about its axis of rotation 6. The degree of taper of frusto-conical main body 3 corresponds to that of the bore of the machine tool which is to be protected; the standard Morse taper is an inclination of 2° 56' from axis of rotation 6. The outer frusto-conical surface of main body 3 is so formed or machined that a substantial portion 9 thereof is slightly under-cut with respect to reference areas 7, i.e. is of slightly smaller diameter. In FIG. 1, this undercut portion is indicated by the dimension 8. As shown in the broken-away portion of FIG. 1, undercut area 9 is filled with a soft oil-absorbing material 10, such as floc. Although device 1 is shown as being solid, it is obvious that it can be hollowed from one end, preferably gripping end 2, to save weight and material. Device 1 can be formed of metal, such as aluminum, or plastic. Material 10 can, as noted, comprise floc applied with an adhesive, or alternatively can comprise a fabric or a porous plastic.

The device of this invention has been constructed and tested in conjunction with a Morse taper, i.e. one wherein the taper is 2° 56' with respect to the axis of rotation. In the device tested, undercut area 9 was undercut about two one-hundredths of an inch with respect to reference areas 7, and area 9 was subsequently covered by bonding felt thereto with an epoxy adhesive. The felt thickness was chosen so as to protrude very slightly above reference areas 7.

Figures 2, 3:
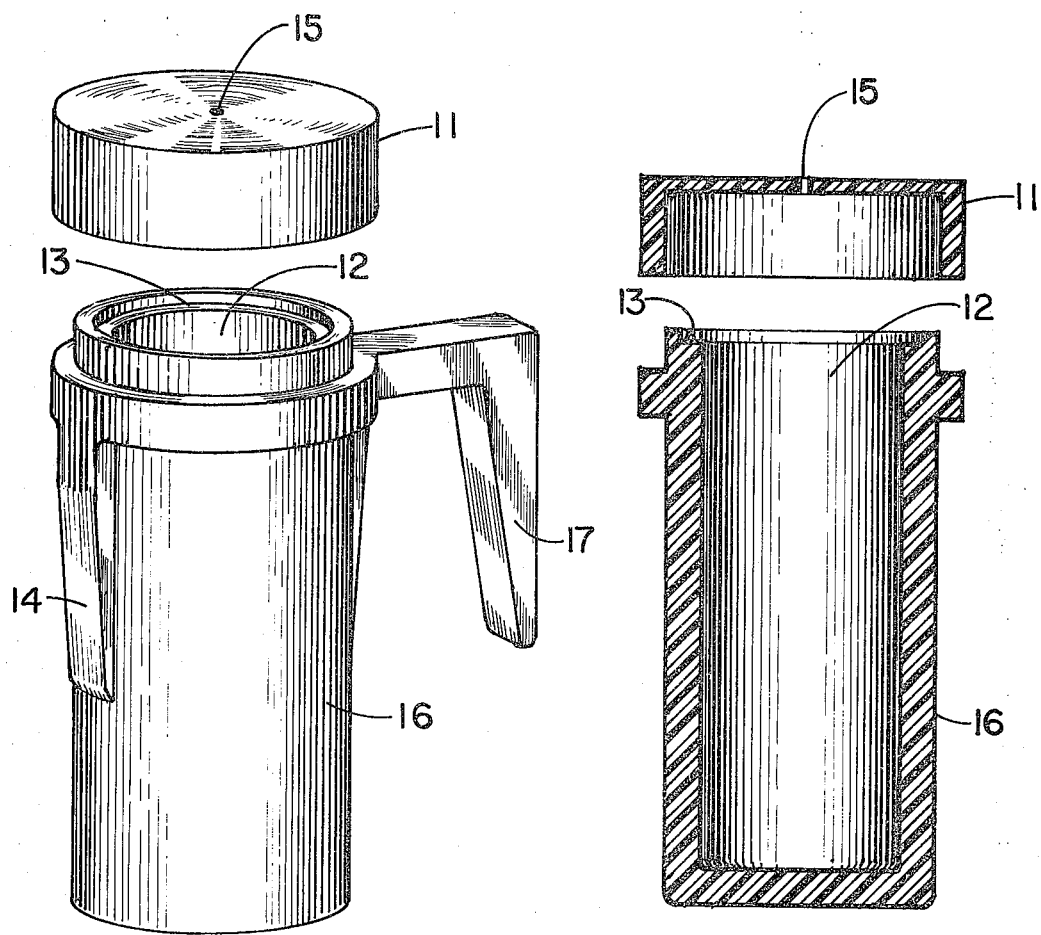
FIG. 2 is an elevation, partially in section, of a container device according to the invention.
FIG. 3 is a section taken on FIG. 2.

Referring next to FIGS. 2 and 3, there is shown a lubricating holder comprising a body portion 16 and a cap portion 11. The lubricating holder body portion is provided with an internal cavity 12 sized somewhat larger in length and diameter than main body 3 and guide end 4 of device 1. The upper end of cavity 12 terminates in an annular lip 13 of diameter just sufficient to receive gripping end 2 of device 1. Holder body portion 16 can be provided with fastening means for suspending it, as from a wall, such as a bracket 17, as well as with a labelling area such as a rib 14. The fastening means can also be any other suitable means such as a dove-tailed bracket adapted to fit into a dove-tailed slot opening for storing said holder body portion and thus said closive device. Cap portion 11 can be provided with a vent hole 15. Lubricating holder body portion 16 and cap portion 11 can be formed of any oil-resistant material, but are preferably transparent so as to readily reveal the contents thereof.

In use, a small amount of lubricating oil is placed into cavity 12 of body portion 16, and main body portion 3 of device 1 is then placed into cavity 12 so that device 1 is suspended by gripping end 2 from lip 13. The amount of oil introduced into cavity 12 is adjusted, as by trial and error, until material 10 is entirely immersed in oil when device 1 is placed in body portion 16. Material 10 is thus permeated with oil, and device 1 can be used to protect the tapered bore of a machine tool by inserting it therein, or can alternatively be simultaneously stored and lubricated in body portion 16, preferably protected from dust by cap portion 11, when the machine tool is in use.

It will be apparent upon study of the foregoing disclosure that the objects set forth herein have been achieved.

What is claimed is:

1. A device for temporarily closing, cleaning and lubricating the tapered bore of a machine tool comprising:

a. an elongated generally frusto-conical body means having a first end of larger diameter than a second end, a major portion of the frusto-conical surface being at a radius about 0.02 inches less than that which would be defined by a true frusto-cone based on the balance of said surface;

b. a soft oil-absorbing coating comprising an adhesive-bonded floc on at least a portion of said major portion; and, c. a gripping means attached to said first end, said gripping means comprising a cylindrical enlargement of diameter greater than that of said first end, oriented coaxially with respect to said body means.

2. The device of claim 1 wherein the cylindrical surface of said gripping means in knurled.

3. The device of claim 1 wherein said major portion is filled with said floc.

4. The device of claim 1 wherein said body is hollow.

5. The device of claim 1 wherein said floc has a thickness of about 0.02 inches.

6. The device of claim 1 further provided with a lubricant supply means comprising (a) a lubricating holder body including a cavity, said cavity having an interior length greater than said body means and an interior diameter greater than said body means and an opening; and, (b) means for suspending said body means within said cavity by engagement with said gripping means.

* * * * *